G. E. STEVENS.
ELECTRIC HEATER.
APPLICATION FILED MAY 29, 1907.

942,874.

Patented Dec. 7, 1909.
2 SHEETS—SHEET 1.

WITNESSES:
Lester H. Palmer
J. Ellis Glen

INVENTOR
GEORGE E. STEVENS.
BY Albert A. Davis
ATT'Y.

G. E. STEVENS.
ELECTRIC HEATER.
APPLICATION FILED MAY 29, 1907.

942,874.

Patented Dec. 7, 1909.

WITNESSES:
Lester H. Fulmer.
J. Ellis Glen

INVENTOR
GEORGE E. STEVENS.
BY Albert S. Davis
ATT'Y.

UNITED STATES PATENT OFFICE.

GEORGE E. STEVENS, OF LYNN, MASSACHUSETTS, ASSIGNOR TO GENERAL ELECTRIC COMPANY, A CORPORATION OF NEW YORK.

ELECTRIC HEATER.

942,874.  Specification of Letters Patent.  Patented Dec. 7, 1909.

Application filed May 29, 1907. Serial No. 376,398.

*To all whom it may concern:*

Be it known that I, GEORGE E. STEVENS, a citizen of the United States, residing at Lynn, county of Essex, State of Massachusetts, have invented certain new and useful Improvements in Electric Heaters, of which the following is a specification.

This invention relates to electric heating devices for heating fluids and has for its object the provision of means whereby a fluid may be heated to a desired temperature in a rapid and efficient manner.

My invention relates more specifically to electric heaters of the type known as instantaneous water heaters in which the fluid is under pressure and is heated during its discharge.

In carrying out my invention I provide, in connection with an electric heater, means whereby the current is turned on to the heater at substantially the same instant that the fluid is turned on. The heater is so arranged that the fluid must follow a circuitous path as it passes through the heater so that the fluid will absorb a maximum amount of heat in passing through it. I also provide a normally-open switch in the heater circuit which is closed by the fluid pressure, the arrangement being such that the fluid in passing to the heater first closes the switch. The manually-controlled mechanism is such that the supply may be connected either directly to the discharge pipe or through the heater to the discharge pipe so that by moving the handle in one direction cold water is obtained while by moving it in the opposite direction hot water is obtained.

Other objects of my invention will appear in the course of the following specification in which I have shown one form of my invention for purpose of illustration.

Figure 1:
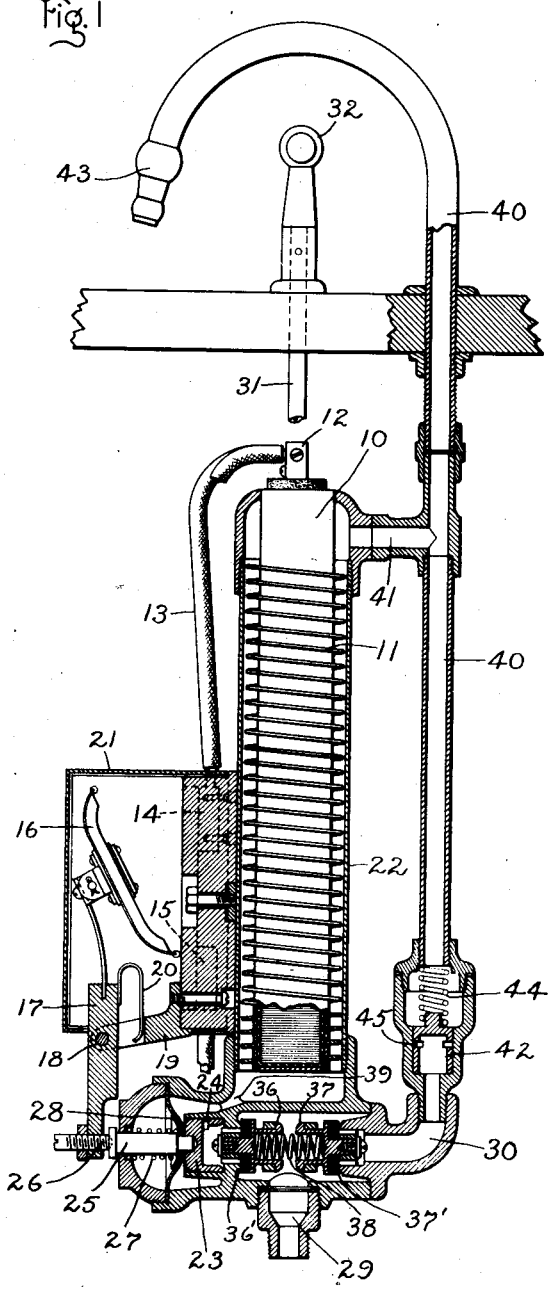
Figure 2:
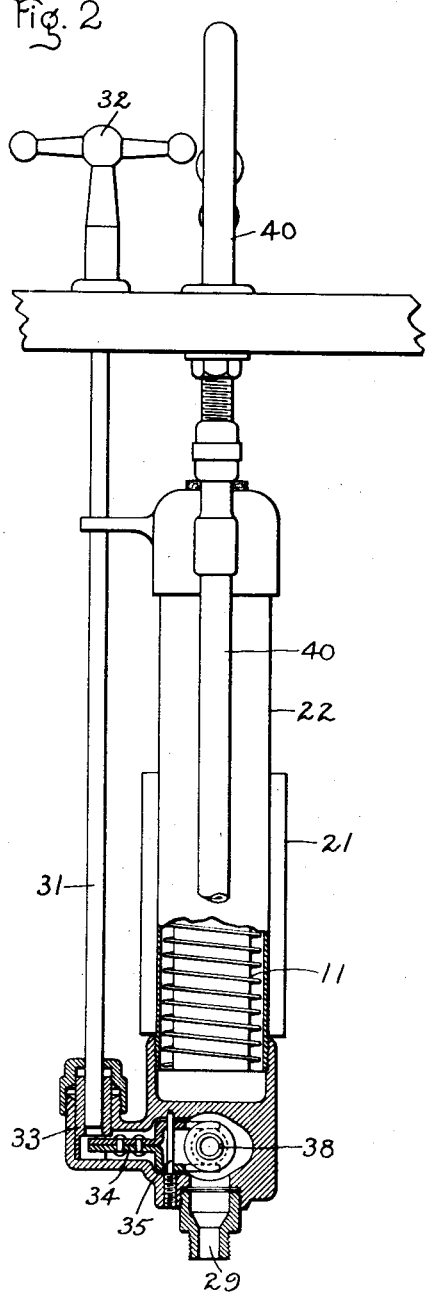
Figure 3:
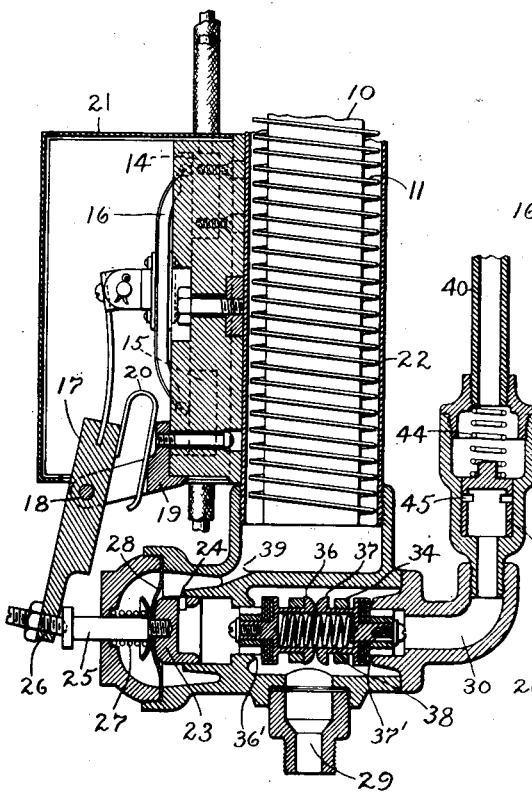
Figure 4:
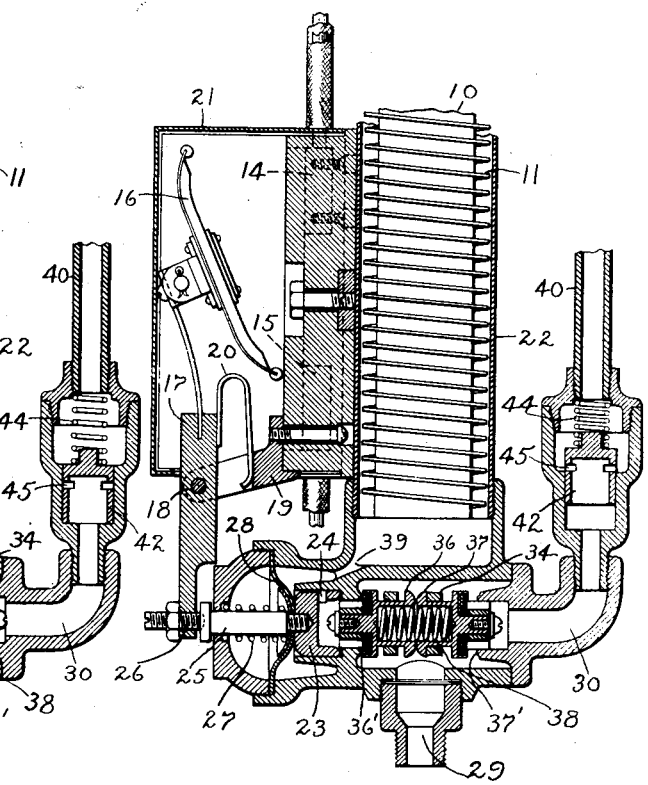
Figure 5:
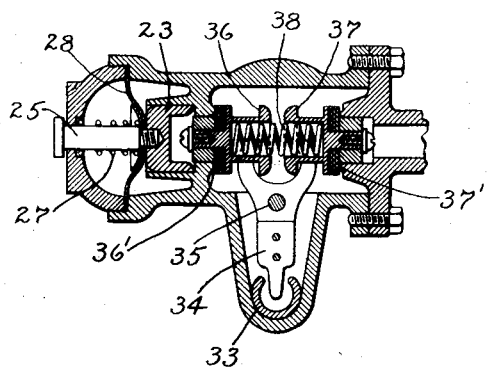

In the drawings, Figure 1 is an elevation mostly in section of a device embodying my invention; Fig. 2 is a side elevation of the same partly in section; Fig. 3 is a detail view of the valve mechanism and switch showing the switch closed and the valve open from the supply to the heater; Fig. 4 is a similar view showing the switch open and the valve open from the supply to the discharge; and Fig. 5 is a detailed view of the valve-operating mechanism.

Referring to the drawings, my device consists primarily of an electric heater for heating the fluid as it passes through under pressure and a switch for controlling the heater and valve mechanism for controlling both the fluid and the switch. The heater which I have shown consists of a cylindrical outer casing 10 of an electric heating unit having spirally wound thereon a flange 11 in good heat conductive relation to the unit. The unit which I have shown is described and claimed in my previous patent No. 803,795 although I do not confine my invention to this particular form of heater. In this heating unit two leads are brought out at the same end, one being connected at 12 while the other lead 13 is connected to the terminals 14 and 15. The circuit of the unit is normally broken at these terminals by a bridging contact 16 resiliently connected to a bar 17 pivoted at 18 to bracket 19 while a spring 20 is arranged to normally hold the switch in the open position as shown in Figs. 1 and 4. The switch mechanism is inclosed by a casing 21. The unit 10 is surrounded by a casing 22 which fits closely around the flange 11 so that fluid must follow a spiral path from one end of the unit to the other. Secured to the lower end of the unit is a valve mechanism through which the fluid passes from the supply to the heater. This valve as a whole comprises a manually-operated mechanism and a pressure-operated mechanism, the former admitting fluid pressure to the latter. The pressure-operated mechanism comprises a cup-shaped valve 23 having a port 24 connected to a stem 25, which stem extends through the valve casing and is adjustably connected to the switch-operating arm 17 at 26. A spring 27 normally holds the valve in the position shown in Fig. 1 in which the port is covered and the switch is held open. A diaphragm 28 is secured at the back of the valve and at its periphery is secured to the valve casing. A supply pipe is connected to the valve at 29 while discharge passage 30 is for the fluid which comes directly from the supply. I supply a mechanism whereby the fluid may flow either directly from the supply to the discharge 30 or to the valve 23. This mechanism consists of a valve stem 31 with an operating handle 32 at its upper end and at its lower end a sleeve 33 which is cut away so as to admit at one end the lever 34 pivoted at 35, the opposite end of which is forked so as to engage the two valves 36 and 37.

These valves are chambered out to receive a spring 38 which forces them apart so that they engage their respective valve seats 36' and 37'. Valve 36 controls the port leading to the valve 23 while valve 37 controls the port leading from the supply pipe to the discharge 30.

It will be seen that by turning the stem 31 in one direction valve 36 will be opened while by turning it in the opposite direction valve 37 will be opened, both against the tension of the spring 38. When the valve 36 is open, fluid will pass from the supply pipe 29 to the valve 23. The pressure upon the valve 23 presses the spring 27 and the valve moves outward until the port 24 is uncovered. The fluid then passes through the passage 39 into the heater casing. The parts are then in the position shown in Fig. 3 in which the switch is closed. The fluid pressure upon the diaphragm 28 forces the switch closed with increased pressure. The fluid will now pass through the heater into the discharge pipe 40 which is connected to the upper part of the heater casing by pipe 41. A spring-pressed check valve 42 is provided in the discharge pipe so that the fluid cannot return from the pipe 40 to the discharge 30 but must flow from the nozzle 43. When the stem is turned in the opposite direction so as to open the valve 37, fluid will pass through the discharge passage 30 to the valve 42 which will move against the tension of the spring 44 until the port 45 is uncovered. Fluid will then discharge directly through the nozzle.

It will be seen that by turning the handle 32 in one direction hot water will be discharged from the nozzle while by turning it in the opposite direction fluid at the temperature of the supply will be discharged. The current is never on the heater except when the fluid is passing through it so that there is no danger of burning it out, and the losses due to radiation and the like are reduced to a minimum. The valve being operated by the fluid pressure, the current cannot be turned on until the fluid has passed it. The device is thus a proof against injury due to careless handling.

While I have shown my device embodied in specific mechanism, it should be understood that I do not limit it to this construction since various modifications will suggest themselves to those skilled in the art without departing from the spirit of my invention, the scope of which is set forth in the annexed claims.

What I claim as new and desire to secure by Letters Patent of the United States, is,—

1. The combination with an electric fluid heating device, of means for delivering fluid thereto under pressure, and means operated by the fluid pressure for controlling the flow of fluid and the circuit of the heater.

2. The combination with an electric fluid heating device, of means for delivering fluid thereto under pressure, and means controlled by the fluid pressure for admitting fluid to the heater and closing the circuit of the heater.

3. The combination with an electric fluid heater, of means for delivering fluid thereto under pressure, a switch in the heater circuit, and means controlled by the fluid as it passes to the heater for operating said switch.

4. The combination with an electric fluid heater, of means for delivering fluid thereto under pressure, a normally-open switch in the heater circuit, and means controlled by the fluid as it passes to the heater for closing said switch.

5. The combination of an electric fluid heater, a discharge pipe, valve mechanism for delivering fluid under pressure either to the heater or to the discharge pipe, and means operated by the fluid pressure for controlling the circuit of the heater.

6. The combination of an electric fluid heater, a discharge pipe therefor, valve mechanism for delivering fluid under pressure either to the heater or the discharge pipe, a normally-open switch in the heater circuit, and means operated by the fluid as it passes to the heater for closing said switch.

7. The combination of an electric fluid heater, a discharge pipe connected thereto, valve mechanism for admitting fluid under pressure to the discharge pipe either directly or through the heater, a switch in the heater circuit, and means controlled by the fluid as it passes to the heater for operating said switch.

8. A fluid heater comprising a cylindrical electric heating unit, a flange spirally arranged in heat conductive relation thereto, a casing surrounding said flange, connections for delivering fluid into the casing under pressure, a switch in the circuit of said unit, and mechanism controlled by the fluid as it enters the casing for operating said switch.

9. A fluid heater comprising a cylindrical electric heating unit, a flange spirally arranged in heat conductive relation thereto, a casing surrounding said flange, connections for admitting fluid into the casing under pressure, a switch in the circuit of said unit biased to the open position, and a mechanism operated by the fluid as it enters the casing for closing said switch.

10. The combination with an electric fluid heater, of a switch in the heater circuit, a valve operated by fluid pressure for admitting fluid to the heater, and mechanism whereby the movement of the valve to open position closes the switch.

11. The combination with an electric fluid heater, of a switch in the heater circuit, a spring-pressed valve for admitting fluid to the heater, a discharge pipe, manually-operated mechanism for admitting fluid either to the valve or the discharge pipe, and a mechanism whereby the movement of the valve to open position closes the switch.

12. The combination with an electric fluid heater, of a normally-open switch in the heater circuit, a valve spring pressed to a closed position for admitting fluid to the heater, a discharge pipe having a check valve therein connected to the heater, manually-operated mechanism for admitting fluid either to the valve or the discharge pipe, and mechanism whereby the movement of the valve to open position closes the switch.

13. In a water heating system, the combination with an electric water heater, of a switch in the circuit of said water heater, a switch operating rod, a piston coöperating with said switch operating rod, the said piston being acted upon by the flowing water in the system to close said switch, and a spring coöperating with said switch operating rod to open said switch when the water in the system ceases to flow, substantially as described.

In witness whereof, I have hereunto set my hand this 27th day of May, 1907.

GEORGE E. STEVENS.

Witnesses:
JOHN A. MCMANUS, Jr.,
PHILIP F. HARRINGTON.